W. W. LEWIS.
COMBINATION FLOWER POT.
APPLICATION FILED DEC. 29, 1908.

918,563.

Patented Apr. 20, 1909.

Witnesses:
M. J. Spalding
Edward Maxwell

Inventor:
William Whitney Lewis,
by Geo. W. Maxwell,
Attorney.

UNITED STATES PATENT OFFICE.

WILLIAM WHITNEY LEWIS, OF COHASSET, MASSACHUSETTS.

COMBINATION FLOWER-POT.

No. 918,563.   Specification of Letters Patent.   Patented April 20, 1909.

Application filed December 29, 1908. Serial No. 469,813.

*To all whom it may concern:*

Be it known that I, WILLIAM WHITNEY LEWIS, a citizen of the United States, and resident of Cohasset, in the county of Norfolk and State of Massachusetts, have invented an Improvement in Combination Flower-Pots, of which the following description, in connection with the accompanying drawings, is a specification, like numerals on the drawings representing like parts.

Although my invention is primarily intended for use in special places it is nevertheless adapted to general use, and it has for its primary object the provision of means whereby a plant may be properly supplied with moisture for a long period at one filling of the pot with water. By properly supplied I mean that the plant shall receive exactly the right amount of moisture and no more, irrespective of whether the maximum or minimum supply is present in the outer vessel.

Stated in general terms, my invention resides in providing an outer vessel adapted to hold a supply of water and an inner vessel removably fitting said outer vessel and imperforate throughout its sides and bottom, so that only the amount of moisture can reach the plant which is permitted to pass through the porous portion of the pot, the area of said porous portion being definitely limited by rendering all but said prescribed area impervious to the passage of moisture, as for instance by enameling the same on one or both sides, preferably the outside.

Besides these features, my invention includes certain other devices which will be more fully pointed out in the course of the following description, reference being had to the accompanying drawings in which I have shown a preferred embodiment of the invention.

Figure 1:
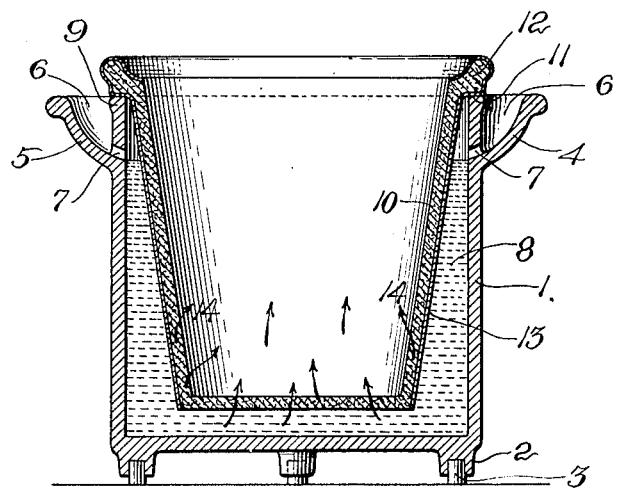
Figure 2:
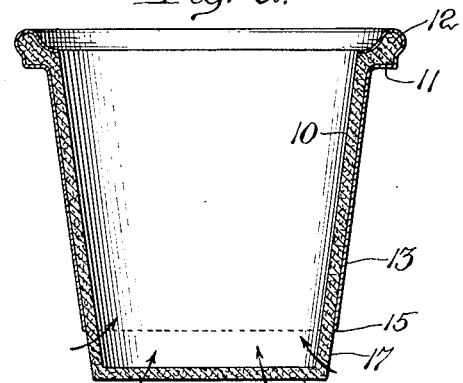
Figure 3:
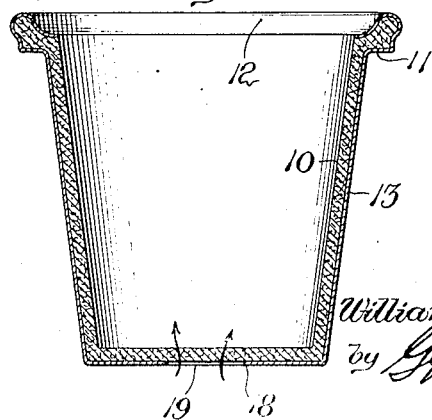

In the drawings, Figure 1 is a central vertical cross sectional view of the complete apparatus; and Figs. 2 and 3 are similar sectional views showing different constructions of the flower-containing portion of the apparatus.

In many situations it is desired to have not only an ornamental receptacle for growing plants or flowers but one which, when put in place, contains a water supply sufficient for a long period, as for instance on top of a piano or a highly polished table, mantel, or the like, where not even a drop of water must fall. Accordingly I provide an external portion 1, preferably of vitreous or other non-absorbent material, herein shown as provided with legs 2 containing rubber feet 3, said outer receptacle 1 having a spout 4 and preferably another spout 5 opposite so as to constitute at the same time handles, said spouts having openings 6 connecting to the interior through holes or passages 7 through which water may pass to fill the receptacles as indicated at 8. Seated on the top rim 9 of this receptacle 1 is an inner pot 10 for holding the dirt and growing plant. Preferably this pot is provided with a shoulder 11 adjacent its top edge 12 which fits down tightly on the edge 9 making a more or less tight joint, so that the water 8 is thereby not only prevented from slopping out in case the receptacle is jarred, but is likewise prevented from evaporating unduly. The pot 10 has no hole through it, this feature being an important characteristic of the preferred embodiment of my invention. On the other hand the material of which it is made is quite porous, so as to admit a predetermined constant passage of moisture from the body of water 8. A portion 13 of the area of the porous pot is rendered impervious to the passage of water, said portion being herein shown as all the external surface of the vertical walls and top edge or peripheral lip. This non-absorbent portion may be secured by enamel, glazing paint, wax, or any other suitable filling which seals the pores. The result is that the water percolates through the porous bottom in exactly the measure required for the proper sustenance of the plant and no more. The water reservoir or external receptacle holds sufficient water to supply the plant preferably for seven or eight days at the least. The water rises through the soil in the pot 10 from the bottom of the pot only, except a certain portion of the water which is carried up in the porous walls of the pot by capillary attraction as indicated by the arrows 14. The non-absorbent upper portion of the pot prevents the water from entering the top soil to the injury of the plant. But, still more important, it limits the supply of moisture to a practically uniform rate, irrespective of the depth of the water in the reservoir, prevents flooding of the pot, and the upper portion of the pot is prevented from becoming a wasteful evaporating medium as in the ordinary construction heretofore. My invention compels the moisutre to be supplied not only uniformly but directly to the roots of the plants as by nature, i. e. from below. The top soil in the pots at all times maintained comparatively dry and hence porous for the admission of air, thereby promoting the healthy growth of the plants.

I am aware that it has heretofore been proposed to supply a potted plant with water contained in the surrounding reservoir, and accordingly I do not claim the same broadly, but the previous construction has no means of preventing flooding of the plant and restricting the supply of moisture to an even uniform rate of flow, and could not prevent the more or less rapid evaporation of the water supply, but left it all times in more or less doubt as to whether the pot was being supplied properly or improperly, or perhaps not at all; whereas by my invention the original full supply of water may be absolutely depended upon to last for seven or eight days in view of the fact that it can only reach the soil by passing through the porous but otherwise imperforate pot, and then only through the definitely restricted predetermined area which experience may prove the most advantageous for any given variety of plant or other special requirement. Water need be supplied only at regular intervals, and in case of the absence of the plant-tender, the plants cannot suffer for want of water for the length of time definitely known beforehand. The opposite spouts not only serve as convenient handles, but one permits the escape of air as the water is poured in at the other.

In Fig. 2 I have shown the non-absorbent and impervious surface 13 as stopping at 15 so that water is freely admitted through the porous bottom 16 and a peripheral portion 17 of the sides, as would be required by certain plants, as for instance ferns. In Fig. 3 the enamel of other water barrier stops at 18 so that the porous area available to the free passage of water is limited to a small central portion 19 of the bottom, thereby restricting the flow as required by many plants, as for instance the cactus. For general purposes I have found that the porous area shown in Fig. 1 is rightly proportioned to an average size of pot for ordinary plants.

As already intimated, it will be understood that my invention is capable of a wide variety of embodiments, and accordingly I do not limit myself to mechanical details further than expressed in the claims.

Having described my invention, what I claim as new and desire to secure by Letters Patent is:

1. A combination flower pot, consisting of an outer reservoir for holding a water supply and an inner pot removably depending within said reservoir so as to be normally surrounded by the water in the reservoir, said pot having its walls and bottom imperforate, a restricted area of the lower portion of said pot being porous for the free percolation of moisture with an evenly regulated flow, and the rest of said pot being non-absorbent to the passage of water therethrough from said reservoir to the interior of the pot.

2. A combination flower pot, comprising an external reservoir having opposite handle-like spouts communicating with the interior of the reservoir, a removable pot supported by the top edges of the reservoir and depending therein so as normally to be surrounded by the water in the reservoir, a predetermined portion of the depending surface of said pot being rendered impervious to the passage of water and the rest of the pot being porous for the free passage of water therethrough but otherwise imperforate.

3. A combination flower pot, comprising an external water reservoir, a pot depending therein having a laterally projecting peripheral flange fitting tightly upon the top edge of said reservoir for closing the latter, said pot having a restricted area of its lower portion porous for the free passage of water and the rest of its external surface rendered impervious to the passage of water therethrough.

In testimony whereof, I have signed my name to this specification, in the presence of two subscribing witnesses.

WILLIAM WHITNEY LEWIS.

Witnesses:
   M. J. SPALDING,
   GEO. H. MAXWELL.